United States Patent
Truong et al.

(10) Patent No.: US 8,793,806 B1
(45) Date of Patent: Jul. 29, 2014

(54) SYSTEMS AND METHODS TO SELECTIVELY LIMIT ACCESS ONLY TO A SUBSET OF CONTENT, IDENTIFIED IN A WHITELIST, OF A LIBRARY OF CONTENT

(75) Inventors: Brian Truong, San Bruno, CA (US); Brian Anthony Palmer, San Mateo, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/548,657

(22) Filed: Jul. 13, 2012

(51) Int. Cl.
*H04L 29/06* (2006.01)
*G06F 21/62* (2013.01)

(52) U.S. Cl.
CPC .............. *H04L 63/101* (2013.01); *G06F 21/62* (2013.01)
USPC ................................ 726/27; 726/26; 713/182

(58) Field of Classification Search
USPC .......................................................... 726/27
See application file for complete search history.

(56) References Cited

U.S. PATENT DOCUMENTS

| | | | |
|---|---|---|---|
| 2003/0044762 A1* | 3/2003 | Bergan et al. | 434/350 |
| 2007/0050467 A1* | 3/2007 | Borrett et al. | 709/213 |
| 2007/0118886 A1* | 5/2007 | Martin | 726/5 |
| 2007/0164846 A1* | 7/2007 | Pedolsky | 340/5.2 |
| 2008/0209514 A1* | 8/2008 | L'Heureux et al. | 726/3 |
| 2008/0222117 A1* | 9/2008 | Broder et al. | 707/3 |

* cited by examiner

*Primary Examiner* — Yogesh Paliwal
(74) *Attorney, Agent, or Firm* — Amin, Turocy & Watson, LLP

(57) ABSTRACT

This disclosure relates to generating whitelists respectively identifying subsets of content from a library of content, maintaining respective associations between tokens and the whitelists, and selectively limiting access only to the subsets of content identified in whitelists based upon one or more tokens included in a request for access to the library of content.

36 Claims, 14 Drawing Sheets

US 8,793,806 B1

SYSTEMS AND METHODS TO SELECTIVELY LIMIT ACCESS ONLY TO A SUBSET OF CONTENT, IDENTIFIED IN A WHITELIST, OF A LIBRARY OF CONTENT

TECHNICAL FIELD

This disclosure generally relates to systems and methods that facilitate selectively limiting access only to a subset of content, identified in a whitelist, of a library of content.

BACKGROUND

The internet allows content providers, such as publishers and individuals, to easily provide content to a large population of content consumers. Vast amounts of content are being published by content providers to content sites, such as social media and social networking sites. For example, individuals with mobile phones can record events and publish videos to a social media site for anyone to view. Furthermore, more formal publishers, such as for example educational institutions, advertisers, or production companies, produce professional quality content to be published on the same content sites as an individual. A consumer wanting to explore available content may perform a search on the content site to retrieve a resulting list of content. However, certain entities from which a consumer may want to access the content site may find certain content objectionable. For example, a school may want its students to have access to educational content on the content site, but not other content. Conventionally, entities have not been able to restrict access to specific content on a content site, and thus these entities typically block access to the content site.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the purpose of this summary is to present some concepts related to some exemplary non-limiting embodiments in simplified form as a prelude to more detailed description of the various embodiments that follow in the disclosure.

In accordance with a non-limiting implementation, a whitelist component that generates a whitelist, including one or more content items from a library of content items, associated with a token, wherein the token indicates restriction of content items to the whitelist associated with the token, a token receiving component that receives a request for access to the library of content items, wherein the request includes the token, and a content presentation component that, in response to receipt of the token indicating restriction of content items to a whitelist associated with the token, presents a user interface in whitelist restricted mode that restricts access to the library of content items to the one or more content items on the whitelist.

In accordance with another non-limiting implementation, a whitelist associated with a token is generated, including one or more content items from a library of content items, wherein the token indicates restriction of content items to the whitelist associated with the token, a request is received for access to the library of content items, wherein the request includes the token and, in response to receipt of the token indicating restriction of content items to the whitelist associated with the token, a user interface is presented in whitelist restricted mode that restricts access restricts access to the library of content items to the one or more content items on the whitelist.

These and other implementations and embodiments are described in more detail below.

DETAILED DESCRIPTION

Overview

Figure 1:
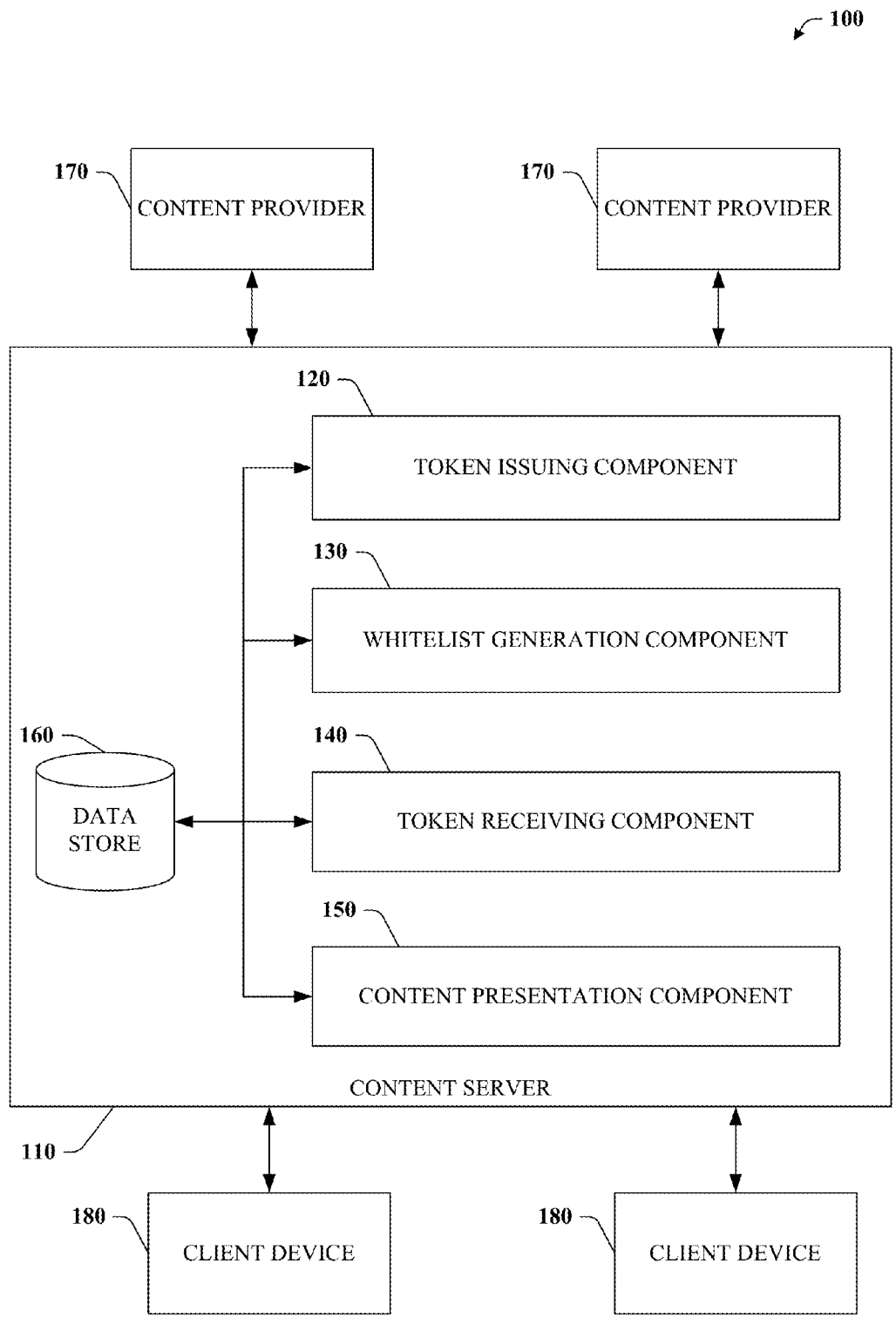
FIG. 1 illustrates a block diagram of an exemplary non-limiting system that selectively provides content to a plurality of client devices based upon whitelists and tokens in accordance with an implementation of this disclosure.

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of this disclosure may be practiced without these specific details, or with other methods, components, materials, etc. In other instances, well-known structures and devices are shown in block diagram form to facilitate describing this disclosure.

It is to be appreciated that in accordance with one or more implementations described in this disclosure, users can opt-out of providing personal information, demographic information, location information, proprietary information, sensitive information, or the like in connection with data gathering aspects. Moreover, one or more implementations described herein can provide for anonymizing collected, received, or transmitted data.

In accordance with various disclosed aspects, a mechanism is provided for an entity to employ a token with a content site to restrict access by users from the entity only to content identified on a whitelist associated with the token. An entity can be any organization of individuals for which access to content is to be restricted from within the computer infrastructure of the entity. For example, an entity can be a school system that wants to restrict access by the students on school system computers or network to a limited subset of content on a content site, for example to only be able to access education content. In another example, a religious organization may want to restrict access by their members to certain content on a content site when the members employ the religious organization's computers or network. In another example, a business or government may want to restrict access by their employees to specific content on a content site when the employees are using the business or government's computers or network.

Content (or content item) can include, for example, video, audio, image, text, or any combination thereof, non-limiting examples of which include, music, speeches, cartoons, short films, movies, televisions shows, documents, books, magazines, articles, novels, quotes, poems, comics, advertisements, photos, posters, prints, paintings, artwork, graphics, games, applications, or any other creative work that can be captured and/or conveyed through video, audio, image, text, or any combination thereof. In a non-limiting example, a social networking application may contain video or photo content that users have uploaded to share. In another non-limiting example, a music application can contain music available for listening. A further non-limiting example is an education site that contains a combination of text articles, videos, photos, and audio recordings. In another example, a tablet device may have game applications available for playing. Furthermore, the content can be available on an intranet, internet, or can be local content.

With reference to the embodiments described below, an example school entity and restriction to educational video content is employed for illustrative purposed only. It is to be appreciated that any type of entity or content can be employed.

Referring now to the drawings, FIG. 1 depicts a system 100 that selectively provides content to a plurality of client devices 180 based upon whitelists. System 100 includes a content server 110 that provides content to client devices 180 remotely. In addition, content server 110 receives or access content from a plurality of content providers 170. Furthermore, content server 110, client devices 180, and content providers 170 can receive input from users to control interaction with and presentation of content, for example, using input devices, non-limiting examples of which can be found with reference to FIG. 10.

Figure 10:
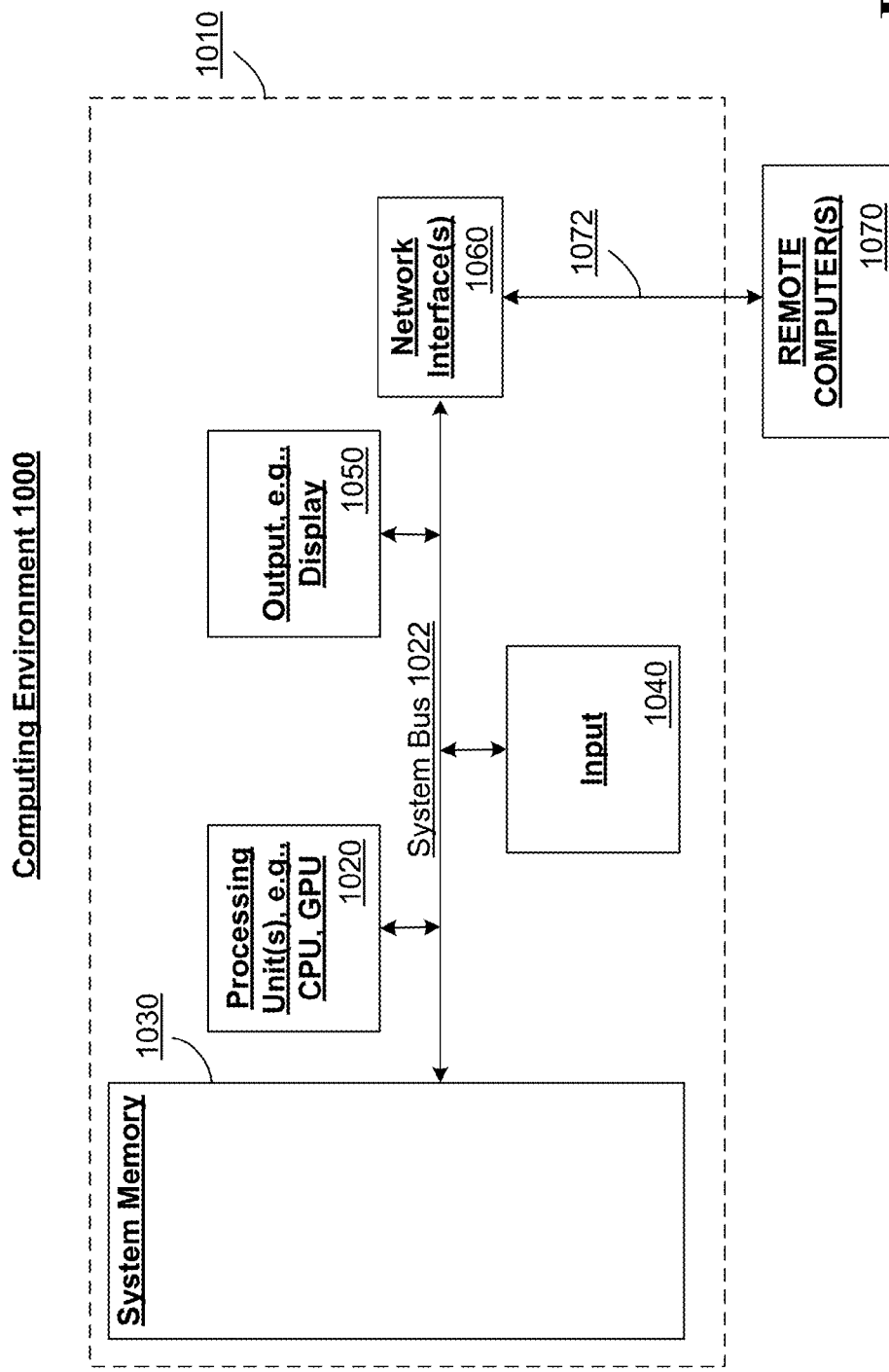
FIG. 10 is a block diagram representing an exemplary non-limiting computing system or operating environment in which the various embodiments can be implemented.

Content server 110, client device 180, and content providers 170, each respectively include a memory that stores computer executable components and a processor that executes computer executable components stored in the memory, a non-limiting example of which can be found with reference to FIG. 10. Client device 180 and content provider 170 can communicate via a wired and/or wireless network to content server 110. It is to be appreciated that while only one content server 110 is depicted, client device 180 and content provider 170 can communicate with a plurality of content servers 110 concurrently. Furthermore, while only two client devices 180 are depicted, it is to be appreciated that any suitable number of client devices 180 can concurrently interact with content server 110. Additionally, while only two content providers 170 are depicted, it is to be appreciated that any suitable number of content providers 170 can concurrently interact with content server 110.

Content server 110, client device 180, and content provider 170 can be any suitable type of device for interacting with or supplying content locally, or remotely over a wired or wireless communication link, non-limiting examples of which include, a mobile device, a mobile phone, a camera, a camcorder, a video camera, personal data assistant, laptop computer, tablet computer, desktop computer, server system, cable set top box, satellite set top box, cable modem, television set, media extender device, blu-ray device, DVD (digital versatile disc or digital video disc) device, compact disc device, video game system, portable video game console, audio/video receiver, radio device, portable music player, navigation system, car stereo, etc. Moreover, video content server 110, client device 180, and content provider 170 can include a user interface (e.g., a web browser or application), that can receive and present displays and generated locally or remotely.

Content server 110 includes a token issuing component 120 that issues tokens to entities. Content server 110 further includes whitelist component 130 that generates whitelists identifying unrestricted content. In addition, content server 110 includes a token receiving component 140 that receives tokens associated with requests from client devices 180. Content server 110 also includes a content presentation component 150 that selectively presents content to client devices 180 based upon whitelists and tokens. Additionally, content server 110 includes a data store 160 that can store content, as well as, data generated by token issuing component 120, whitelist component 130, token receiving component 140, or content presentation component 150. Data store 160 can be stored on any suitable type of storage device, non-limiting examples of which are illustrated with reference to FIGS. 9 and 10.

With continued reference to FIG. 1, token issuing component 120 receives a request from an entity, for example from a client device 180 associated with the entity, to issue a token to the entity. In a non-limiting, the entity can log into a user interface associated with token issuing component 120 to request a token. In another non-limiting example, the entity can request issuance of a token via a Hypertext Transfer Protocol (HTTP) command. In a further non-limiting example, the entity can request issuance of a token via an application programming interface associated with token issuing component 120. It is to be appreciated that any suitable mechanism for an entity to request a token from a content site can be employed. Token issuing component 120 issues a token with a unique identifier to the entity. It is to be appreciated that the issued token can be a token associated with a whitelist associated with the content site, such as a global or custom whitelist. It is to be further appreciated that additional tokens, with respective unique identifiers, can be issued to the entity associated with additional global or custom whitelists.

Figure 2:
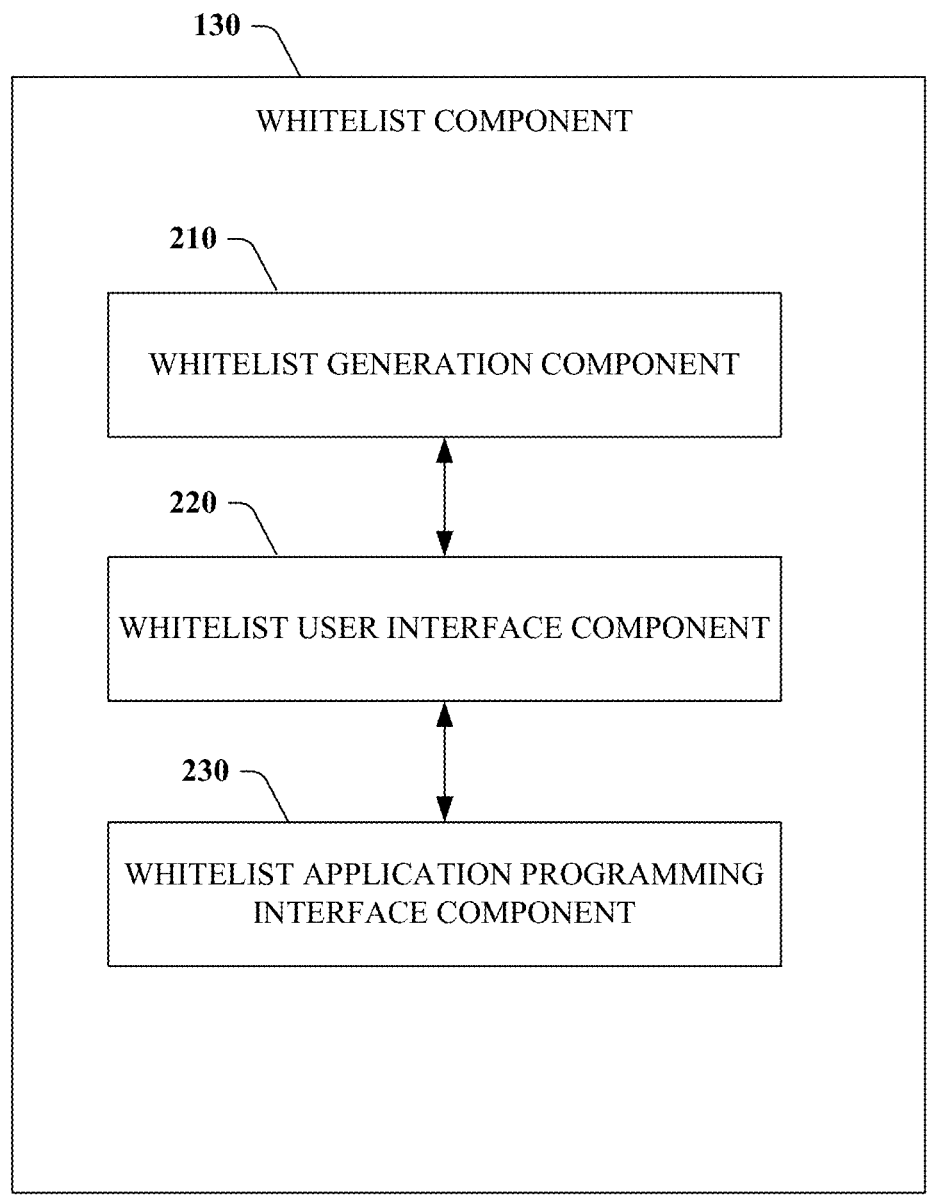
FIG. 2 illustrates a block diagram of an exemplary non-limiting whitelist component that generates whitelists, associated with tokens, identifying unrestricted content in accordance with an implementation of this disclosure.

Referring to FIG. 2, whitelist component 130 that generates whitelists, associated with tokens, identifying unrestricted content. A whitelist identifies content that is accessible (unrestricted) to users employing a token associated with the whitelist. For example, when a user attempts to access a content site and the token is submitted with the user's access attempt, the content site will limit access such that the user will only be able to access content identified in the whitelist associated with the token. It is to be appreciated that in a non-limiting example, a whitelist can be associated with a plurality of tokens, for example, a global whitelist at a content site. It is to further be appreciated that in a non-limiting example a token is associated with a single whitelist, for example a custom whitelist for an entity as described below. Whitelist component 130 includes, whitelist generation component 210 that generates one or more global whitelists associated with the content site. For example, whitelist generation component 210 can employ content filtering criteria, such as established by administrators of the content site, for filtering content from a library of available content for inclusion on a global whitelist. For example, in a non-limiting example, content filtering criteria, can include, content provider, text, images, audio or video characteristics, metadata, voice recognition, facial recognition, speech to text conversion, content subject matter, demographics, inappropriateness flags, rating, parental rating, parental advisory, comments, or any other criteria associated with content.

In another non-limiting example, whitelist component 130 maintains a mapping between whitelists and tokens, thereby allowing a many-to-one relationship between whitelists and tokens. For example, a content site many have more than one global whitelist, and an entity can select via a user interface (not shown) which global or custom whitelists to associate with their token.

Continuing with referring to FIG. 2, whitelist component 130 includes whitelist user interface component 220 that provides a mechanism for an entity to manage custom whitelists. In a non-limiting example, an entity can request additional tokens with respective unique identifiers be issued to the entity that are used to create custom whitelists. In a non-limiting example, a school system may want to create custom whitelists that are associated with sub-groups of their population of users. For example, the school system may want to have separate custom whitelists for grade K-6, middle school grades, high-school grades, teachers, and school administrators. In another non-limiting example, a school system may want to create custom whitelists that are associated with specific computer equipment in their computing environment. For example, in a math lab, the school may want to create a math custom whitelist that only allows access to education math content from computers in the math lab, while a physics lab would have a custom physics whitelist that only allows access to physics educational content from computers in the physics lab. It is to be appreciated that any number of custom whitelists can be created to limit content access for any subgroup of users or computing infrastructure. It is also to be appreciated that specific tokens associated with subgroups of users or computing infrastructure can be communicated to content server 110 along with a requests from the subgroups. Continuing with the example above, a token associated with a K-6 GRADE custom whitelist can be employed when student from grades K-6 attempt to access content server 110.

Furthermore, a token associated with a MATH LAB custom whitelist can be employed when students attempt to access content server 110 from the math lab. It is to be appreciated that multiple tokens can be employed when attempting to access content server 110 to limit content to an intersection of the content identified in the multiple whitelists associated with the tokens. For example, if a student from K-6 is attempting to access content server 110 from the math lab, then two tokens can be employed, one associated with the K-6 GRADE custom whitelist and one associated with the MATH LAB custom whitelist, to limit content to an intersection of the content identified in the two whitelists. It is to be appreciated that in another non-limiting example, content can limited to a union of the content identified in the multiple whitelists associated with the tokens.

Figure 4A:
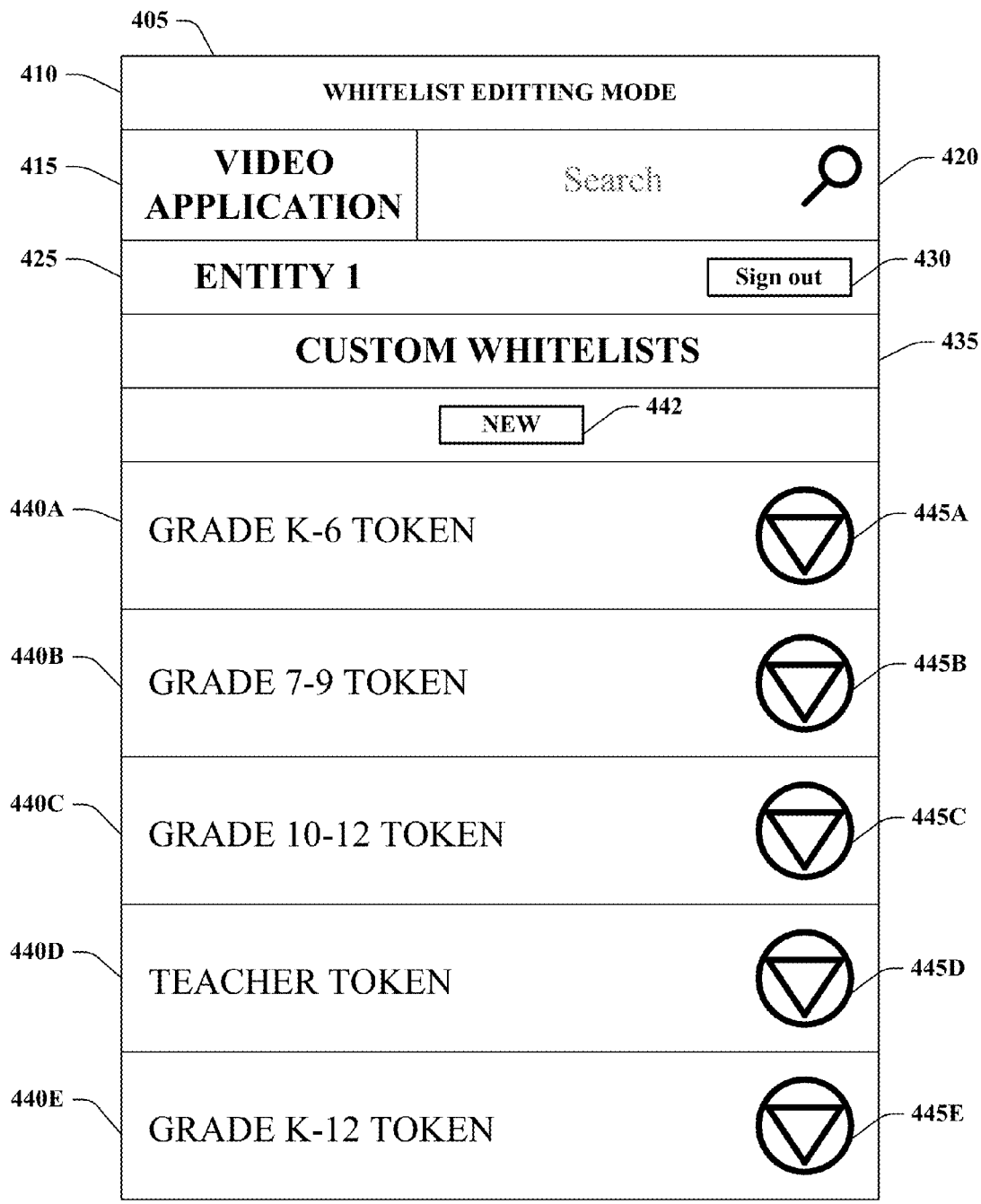
FIG. 4A illustrates an exemplary non-limiting example of a user interface associated with a video application content site presented in whitelist editing mode in accordance with an implementation of this disclosure.

Referring to FIG. 4A, is depicted a non-limiting example user interface 405 associated with a video application content site presented by whitelist user interface component 220. User interface 405 includes a notification area 410 that provides notification to the user using graphics or text about the mode of the user interface. Additionally, user interface 405 includes an application title area 415 that indicates the application currently active or in the foreground of the user interface, which in this example is a "VIDEO APPLICATION". User interface 405 also includes a search area 420 that allows for entering a search for content in the "VIDEO APPLICATION". Furthermore, user interface 405 includes user area 425 that indicates the current user signed into the video application, which in this example is "ENTITY 1", and that also provides a sign-out selection element 430 for the user to sign out of the application. User interface 405 further includes a function title area 435 that indicates a current functional area of the application, which in this non-limiting example is "CUSTOM WHITELISTS" representing a function for managing a list of custom whitelists. In this example, "GRADE K-6 TOKEN" 440A, "GRADE 7-9 TOKEN" 440B, "GRADE 10-12 TOKEN" 440C, "TEACHER TOKEN" 440D, and "GRADE K-12 TOKEN" 440E custom whitelists are depicted along with respective selection elements 445A-E to allow a user to select an action to perform with the associated custom whitelist, for example, by a menu that is activated upon selection of selection elements 445A-E. It is to be appreciated that while only five custom whitelists are depicted, any number of whitelists can be included. Furthermore, navigation elements can be included for navigating the list of custom whitelists, non-limiting examples of which include a scrolling element or touchscreen swipe gesture navigation. Actions can include, but are not limited to, editing the custom whitelist, or marking the custom whitelist as enabled or disabled. User interface 405 also includes a new whitelist selection element 442 that presents a whitelist editor for creating a new custom whitelist. It is to be appreciated that creation of a new custom whitelist can initiate a request to token issuing component 120 for issuance of a new token to associate with the new custom whitelist. Whitelist user interface component 220 can store any selections or entries made by the user using user interface 405.

Figure 4B:
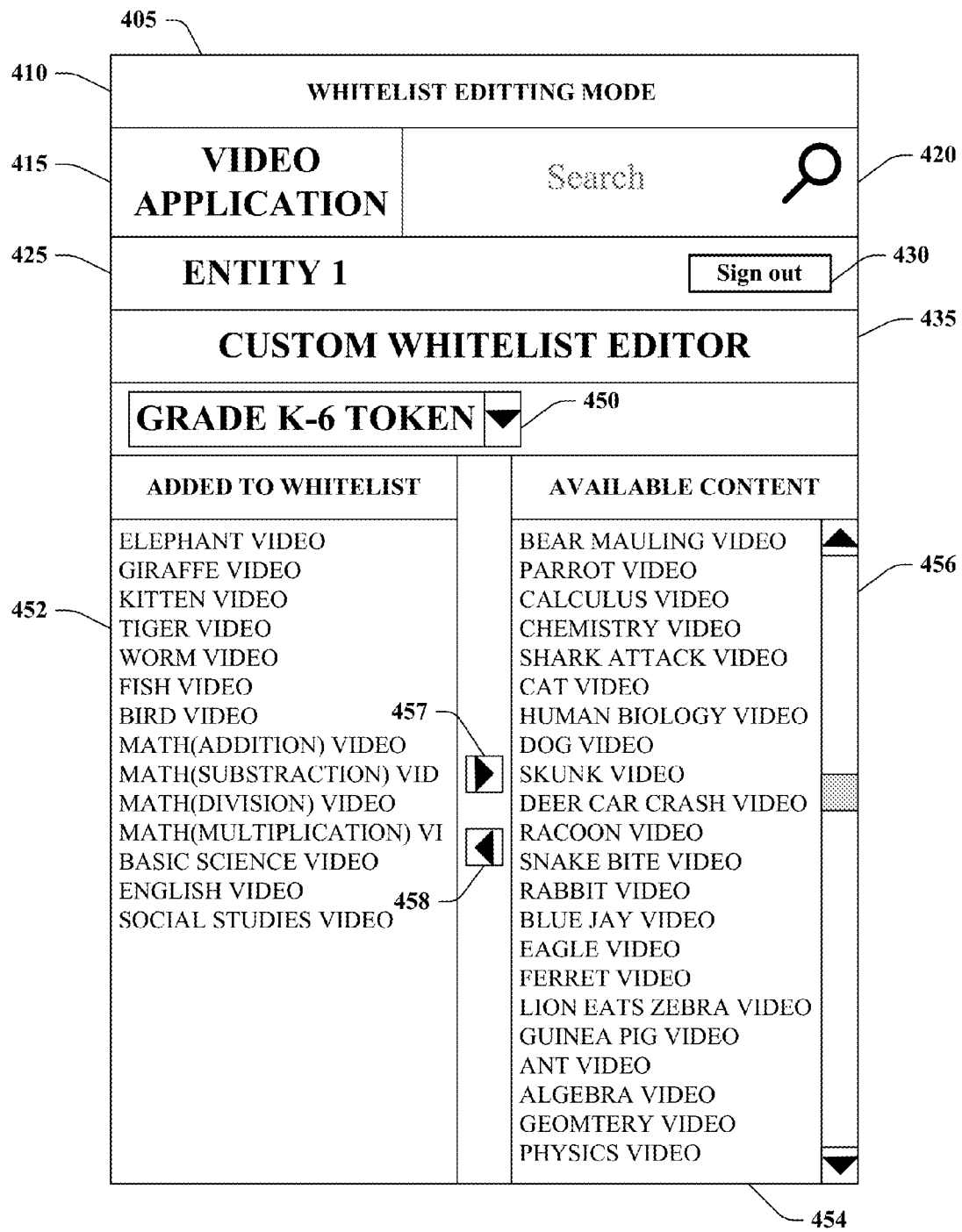
FIG. 4B illustrates an exemplary non-limiting example of a user interface associated with a video application content site presented for editing a custom whitelist in accordance with an implementation of this disclosure.

Referring to FIG. 4B in a non-limiting example, user interface 405 is depicted where "ENTITY 1" has selected "K-6 GRADE TOKEN" 440A custom whitelist for editing. Correspondingly, function title area 435 indicates the current functional area of the application as "CUSTOM WHITELIST EDITOR". User interface 405 further includes a whitelist selection menu 450 that allows for selection of a custom whitelist for editing, this example depicting "K-6 GRADE TOKEN" associated with "K-6 GRADE TOKEN" 440A whitelist. For example, whitelist selection menu 450 can be a drop down menu that includes a list of the custom whitelists previously created. In addition, whitelist selection menu 450 can include a selectable entry for creating a new custom whitelist. User interface 405 also includes an added to whitelist area 452 that shows content that is currently in the custom whitelist selected in whitelist selection menu 450. In this non-limiting example, added to whitelist area 452 shows "ELEPHANT VIDEO . . . SOCIAL STUDIES VIDEO" currently in "K-6 GRADE TOKEN" 440A custom whitelist.

User interface 405 includes an available content area 454 that shows content that is available to be added to the custom whitelist selected in whitelist selection menu 450. It is to be appreciated that available content can be content that is stored locally on content server 110 or remotely at content providers 170. In this example, available content area 454 shows "BEAR MAULING VIDEO . . . PHYSICS VIDEO" available to be added to "K-6 GRADE TOKEN" 440A custom whitelist. In addition, the user can narrow the list of available content by entering a query in search area 420, results of which would appear in available content area 454. User interface 405 includes a scrolling control element 456 for navigating the list of available content in available content area 454. It is to be understood that added to whitelist area 452 can also include a scrolling control element 456 for navigating the list of content in a custom whitelist.

User interface 405 includes a remove content selection element 457 for moving content from the list on the left to the list on the right, in this example, moving content from the added to whitelist area 452 to the available content area 454. User interface 405 also includes an add content selection element 458 for moving content from the list on the right to the list on the left, in this example, moving content from the available content area 454 to the added to whitelist area 452. For example, "ENTITY 1" can use add content selection element 457 and remove content selection element 257 to configure the content included in a custom whitelist (whitelist input). The configured custom whitelist can be stored by whitelist user interface component 220, for example, automatically upon the user navigating away from the "CUSTOM WHITELIST EDITOR" function, upon the user selecting a save whitelist selection element (not depicted), the user performing a specific gesture, or by any other suitable mechanism for storing a custom whitelist.

Referring back to FIG. 2, whitelist component 130 includes whitelist application programming interface 230 component for receiving a new or modified custom whitelist from an entity. It a non-limiting example, an entity can create a custom outside of content server 110 and later submit the custom whitelist to content server 110 using whitelist application programming interface 230. In another non-limiting example, an entity can receive a custom whitelist from a content provider or other entity and submit the custom whitelist to content server 110 using whitelist application programming interface 230. The whitelist can be submitting by the entity to the whitelist application programming interface 230 in any suitable format, non-limiting examples of which include extensible markup language (XML), comma separated values (CSV), extensible binary meta language (EBML), web distributed data exchange (WDDX), javascript object notation (JSON), simple declarative language (SD,), hypertext markup language (HTML) text, or any other data transport format. It is to be appreciated that a new custom whitelist can be submitted with an identifier indicating a new custom whitelist so that a new token associated with the custom whitelist can be issued to the entity. It is also to be appreciated that modification of an existing custom whitelist can by submitted with a unique identifier of the custom whitelist or associated token.

Referring back to FIG. 1, token receiving component 140 receives a token associated with a request for access to content server 110. Token receiving component 140 identifies a whitelist associated with the token. It is to be appreciated that the token can be received through any suitable mechanism, non-limiting examples of which include a Hypertext Transfer Protocol (HTTP) header, a Uniform Resource Locator (URL) parameter, or a Hypertext Transfer Protocol (HTTP) cookie. It is to be further appreciated that token receiving component 140 can receive multiple tokens associated with a request for access to content server 110, as described above, and identify whitelists associated with the multiple tokens.

Figure 3:
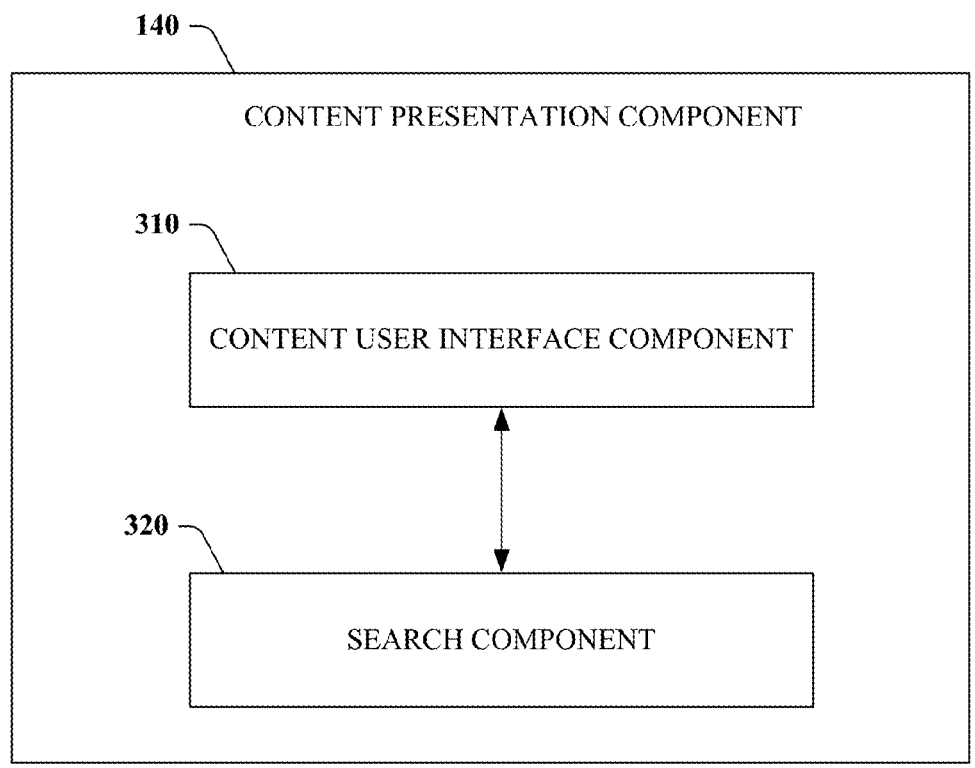
FIG. 3 illustrates a block diagram of an exemplary non-limiting content presentation component that selectively presents a user interface in a mode to restrict content display based upon one or more whitelists in accordance with an implementation of this disclosure.

Referring to FIG. 3, content presentation component 150 includes a content user interface component 310 that selectively presents a user interface in a mode to restrict content access based upon one or more whitelists identified by token receiving component 140. Furthermore, content presentation component 150 includes a search component 320 the selectively restricts search results of content based upon one or more whitelists identified by token receiving component 140. It is to be appreciated that a token may not be submitted with a request for access to content server 110, and thus content presentation component 150 would not limit presentation or searching of content according to whitelists.

Figure 4C:
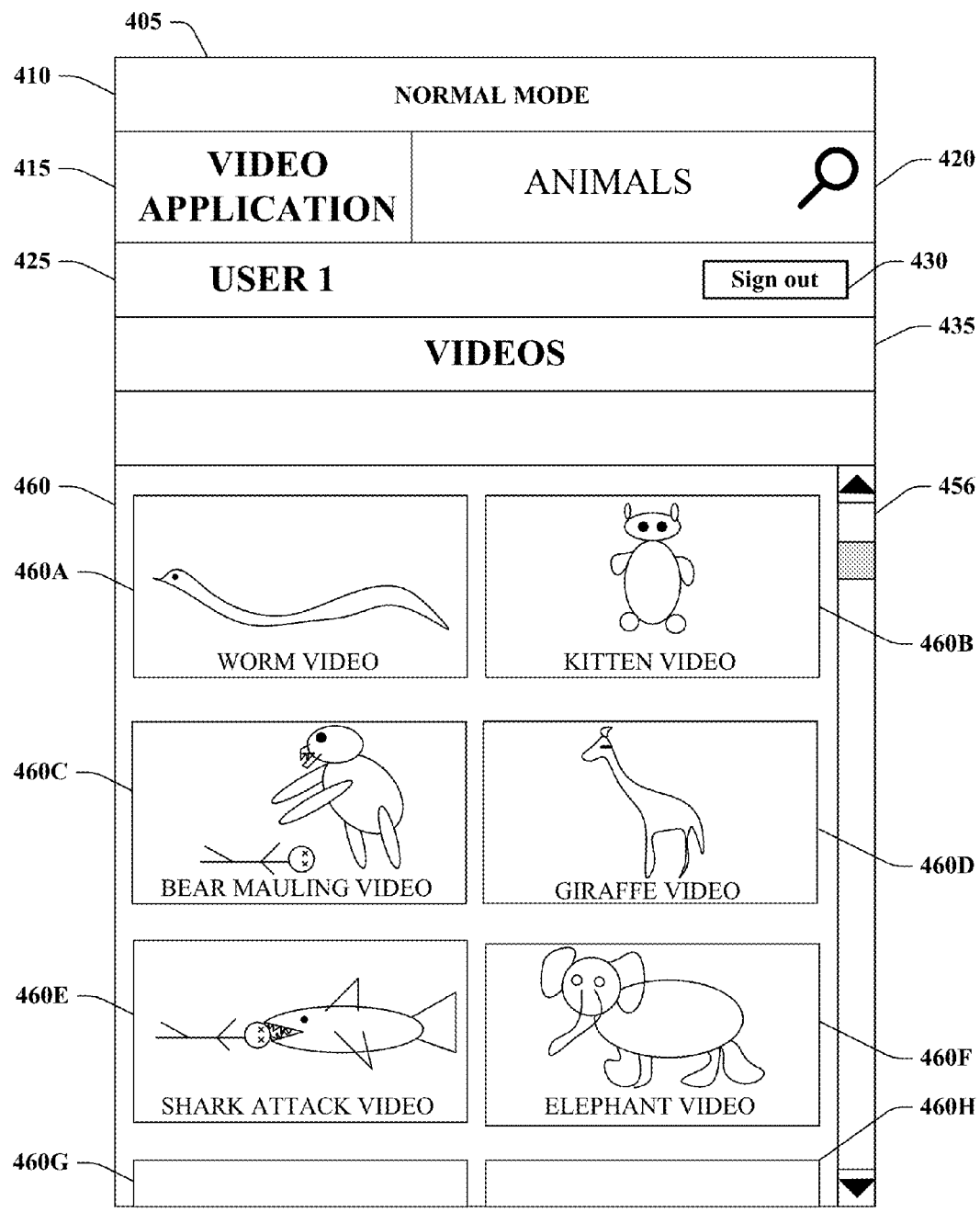
FIG. 4C illustrates an exemplary non-limiting example of a user interface associated with a video application content site for interacting with videos in normal mode in accordance with an implementation of this disclosure.

Referring to FIG. 4C, is depicted a non-limiting example user interface 405 associated with a video application content site presented by content user interface component 310 when a request for access to content server 110 was received without a token. Notification area 410 indicates the video application content site is being employed in "NORMAL MODE" normal mode, meaning there are no whitelist restrictions on accessing or searching content. Function title area 435 indicates the current functional area of the application as "VIDEOS" for interacting with videos, such as searching, browsing, or selection. Furthermore, user interface 405 includes user area 425 that indicates the current user signed into the video application, which in this example is "USER 1", and that also provides a sign-out selection element 430 for the user to sign out of the application. It is to be appreciated that a user does not need to sign into the video application content site in order to employ the site. In a non-limiting example, signing in to the site can be optional, such as to save preferences of the user. In this non-limiting example, a search for "ANIMALS" was entered in search area 420. Search results area 460 depicts videos "WORM VIDEO" 460A, "KITTEN VIDEO" 460B, "BEAR MAULING VIDEO" 460C, "GIRAFFE VIDEO" 460D, "SHARK ATTACK VIDEO" 460E, "ELEPHANT VIDEO" 460F which are visible in a results list generated by search component 320, and videos "FISH VIDEO" 460G and "BIRD VIDEO" 460H which are partially shown in the results lists. It is to be appreciated that the results list depicted in search results area can include any number of videos and can be navigated using any suitable mechanism, a non-limiting example of a scrolling control element 456 is depicted. It is to be appreciated that in a non-limiting example, if no search term is entered, all available videos can be listed in search results area 460. In another non-limiting example, a subset of available videos can be presented, for example, based upon inferred interests of "USER 1".

Figure 4D:
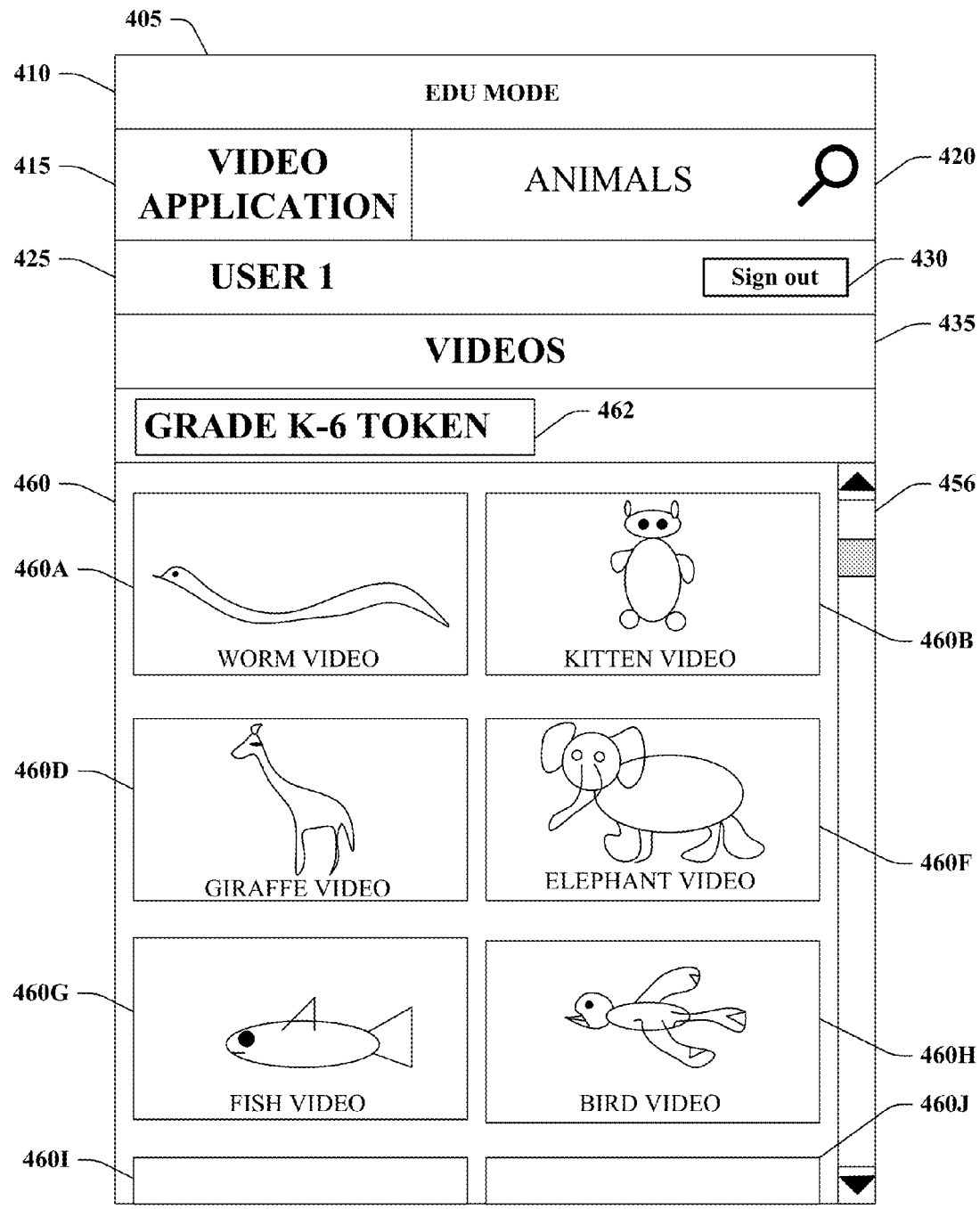
FIG. 4D illustrates an exemplary non-limiting example of a user interface associated with a video application content site for interacting with videos in whitelist restricted mode in accordance with an implementation of this disclosure.

Referring to FIG. 4D, is depicted a non-limiting example user interface 405 associated with a video application content site presented by content user interface component 310 when a request for access to content server 110 was received with one or more tokens. In a non-limiting example, content presentation component 150 can restrict access or search only to content within the intersection of content identified in the one or more whitelists associated with the one or more tokens. In another non-limiting example, content presentation component 150 can restrict access or search only to content within the union of content identified in the one or more whitelists associated with the one or more tokens. Notification area 410 indicates the video application content site is being employed in "EDU MODE" whitelist restricted mode, meaning that the video application content site is being accessed with whitelist restrictions on access and searching of content. It is to be appreciated that any term or graphical indication can be employed to indicate whether the site is being accessed with or without whitelist restrictions. Function title area 435 indicates the current functional area of the application as "VIDEOS" for interacting with videos, such as searching, browsing, or selection. Furthermore, user interface 405 includes user area 425 that indicates the current user signed into the video application, which in this example is "USER 1", and that also provides a sign-out selection element 430 for the user to sign out of the application. Optionally a whitelist notification area 462 can be presented that indicates the whitelists that being employed to restrict access to content, which in this example is "GRADE K-6 TOKEN". In this non-limiting example, a search for "ANIMALS" was entered in search area 420. Search results area 460 depicts videos that identified in the "GRADE K-6 TOKEN" whitelist including "WORM VIDEO" 460A, "KITTEN VIDEO" 460B, "GIRAFFE VIDEO" 460D, "ELEPHANT VIDEO" 460F, "FISH VIDEO" 460G, and "BIRD VIDEO" 460H which are visible in a results list generated by search component 320, and videos 460I and 460J which are partially shown in the results lists. It is to be appreciated in this example, that "BEAR MAULING VIDEO" 460C and "SHARK ATTACK VIDEO" 460E shown in FIG. 4C are not shown in the results list as they were not included in the "GRADE K-6 TOKEN" whitelist. It is to be appreciated that the results list depicted in search results area can include any number of videos and can be navigated using any suitable mechanism, a non-limiting example of a scrolling control element 456 is depicted. It is to be appreciated that in a non-limiting example, if no search term is entered all available videos on the "GRADE K-6 TOKEN" whitelist can be listed in search results area 460. In another non-limiting example, a subset of available videos on the "GRADE K-6 TOKEN" whitelist can be presented, for example, based upon inferred interests of "USER 1".

Figure 4E:
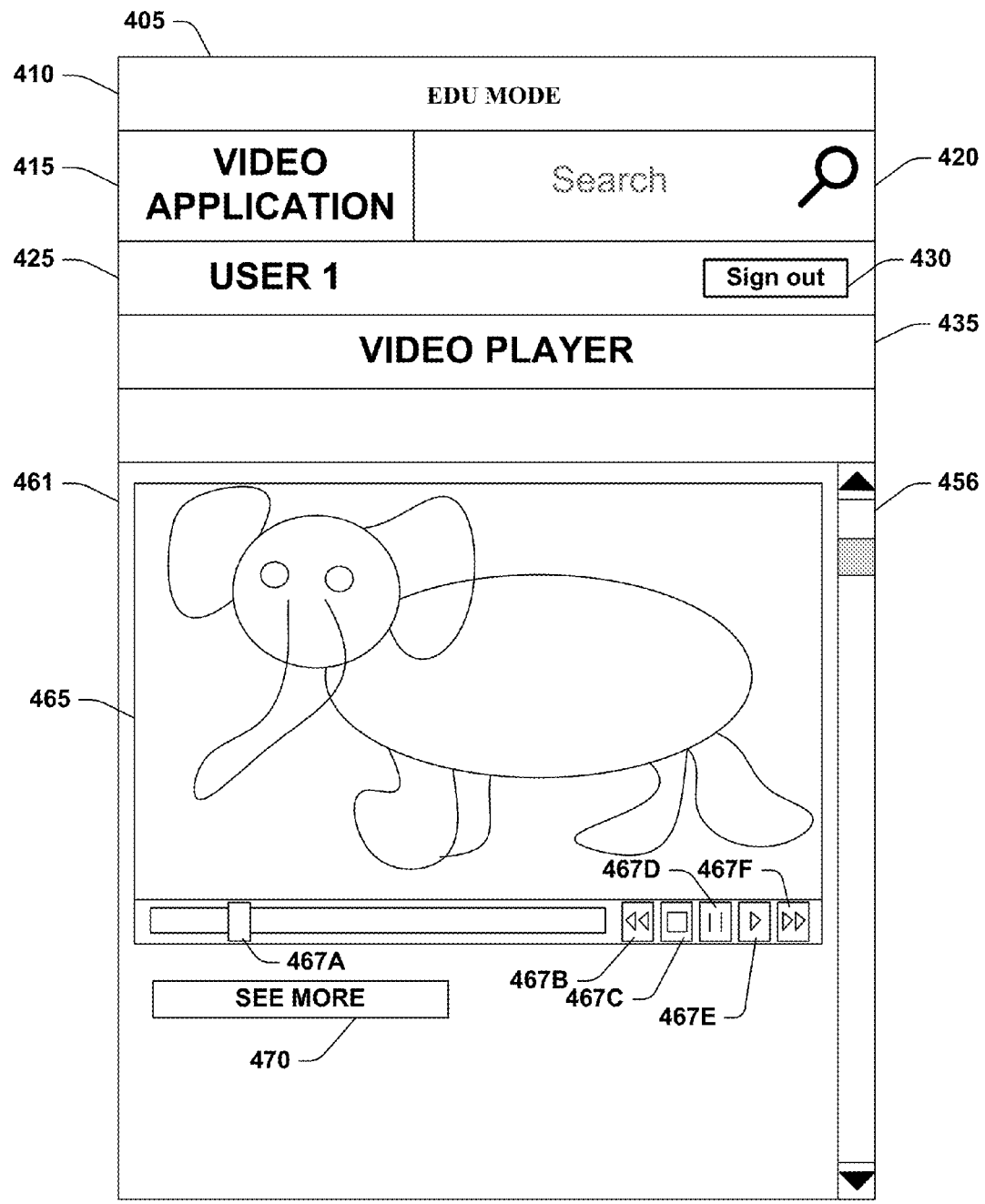
FIG. 4E illustrates an exemplary non-limiting example of a user interface associated with a video application content site for playing back a video in whitelist restricted mode in accordance with an implementation of this disclosure.

Referring to FIG. 4E is depicted a non-limiting example user interface 405 associated with a video application content site presented by content presentation component 150 when "USER 1" has selected "ELEPHANT VIDEO" 460F for playback. Notification area 410 indicates the video application content site is being employed in "EDU MODE" educational mode, meaning that the video application content site is being accessed with whitelist restrictions. Function title area 435 indicates the current functional area of the application as "VIDEO PLAYER" for playing back a video. Furthermore, user interface 405 includes user area 425 that indicates the current user signed into the video application, which in this example is "USER 1", and that also provides a sign-out selection element 430 for the user to sign out of the application. Video playback area 461 depicts video player 465 playing back "ELEPHANT VIDEO" 460F and a see more selection element 470 for showing related content. For example, see more selection element 470 can be selected by "USER 1" to show content related to "ELEPHANT VIDEO" 460F, non-limiting examples of which include videos from the same content provider, videos with similar subject matter, or any other criteria for identifying related content. It is to be appreciated that in "EDU MODE" the related content from see more selection element 470 is limited to content in the one or more whitelists as discussed above in relation to FIG. 4D. It is to be appreciated that in "NORMAL MODE" the related content from see more selection element 470 is not limited to content in whitelists as discussed above in relation to FIG. 4C. Optionally, playback controls appropriate for the content can be presented. In this example, slider control 467A is shown that allows for selection of point of playback of the video content depicted. In addition, rewind control 467B, stop control 467C, pause control 467D, play control 467E, and fast forward control 467F are depicted.

FIGS. 5-8 illustrate various methodologies in accordance with certain disclosed aspects. While, for purposes of simplicity of explanation, the methodologies are shown and described as a series of acts, it is to be understood and appreciated that the disclosed aspects are not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with certain disclosed aspects. Additionally, it is to be further appreciated that the methodologies disclosed hereinafter and throughout this disclosure are capable of being stored on an article of manufacture to facilitate transporting and transferring such methodologies to computers.

Figure 5:
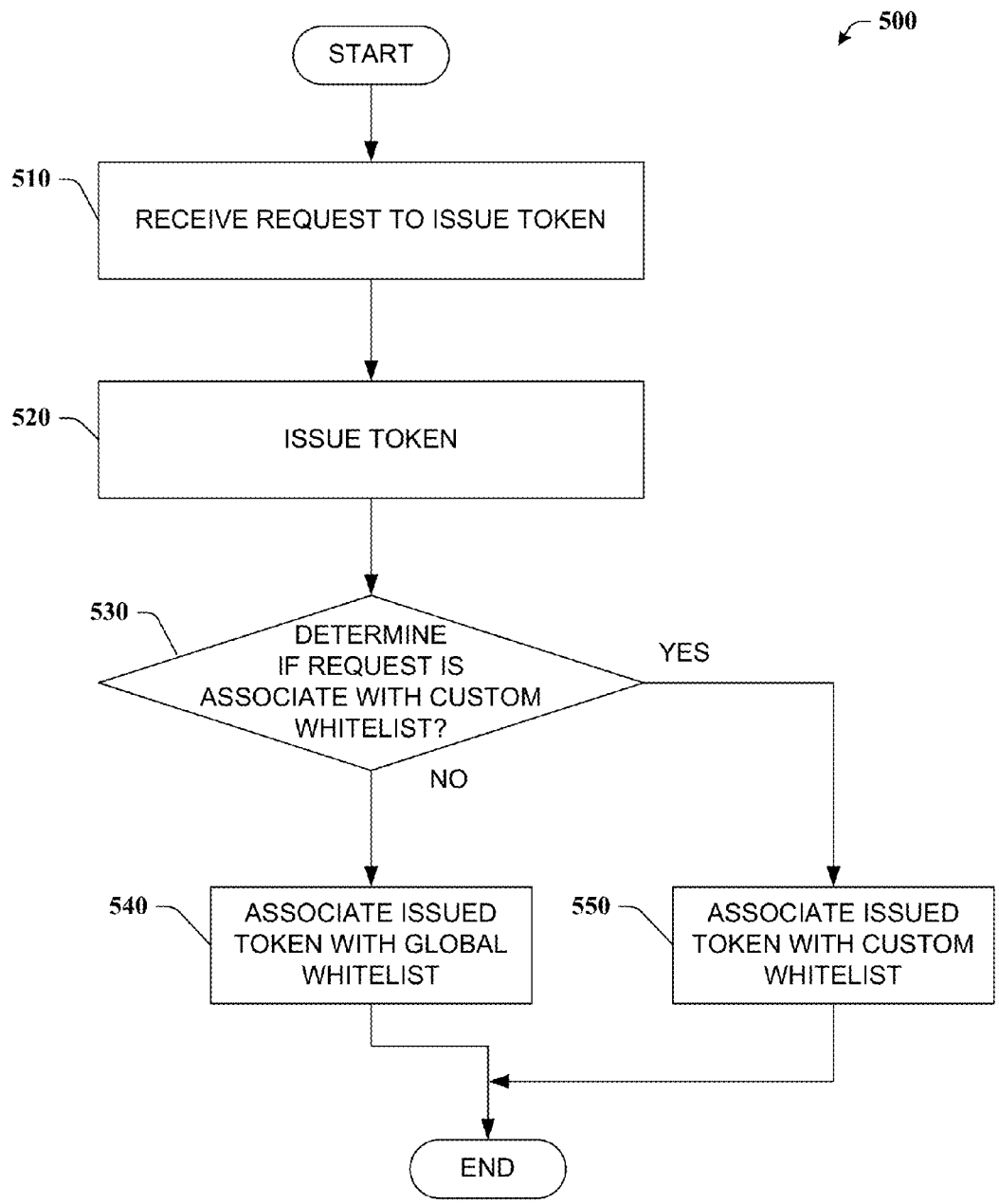
FIG. 5 illustrates an exemplary non-limiting flow diagram for issuing a token in accordance with an implementation of this disclosure.

Referring to FIG. 5, an exemplary method 500 for issuing a token is depicted. At reference numeral 510, a request for issuance of a token is received from a client device 180 associated with an entity (e.g. by a token issuing component 120). At reference numeral 520, a token with a unique identifier is issued to the entity (e.g. by token issuing component 120). At reference numeral 530, a decision is made whether the request to issue a token was associated with creating a custom whitelist (e.g. by a token issuing component 120). If the decision is "NO", meaning the request is not associated with creating a custom whitelist, the method proceeds to reference numeral 540. If the decision is "YES", meaning the request is associated with creating a custom whitelist, the method proceeds to reference numeral 550. It is to be appreciated that the operation at reference numeral 530 is not required if custom whitelists are not employed, in which case the method would proceed from reference numeral 520 to reference numeral 540. At reference numeral 540, the issued token is associated with a global whitelist (by a token issuing component 120). At reference numeral 550, the issued token is associated with the custom whitelist (e.g., by a token issuing component 120).

Figure 6:
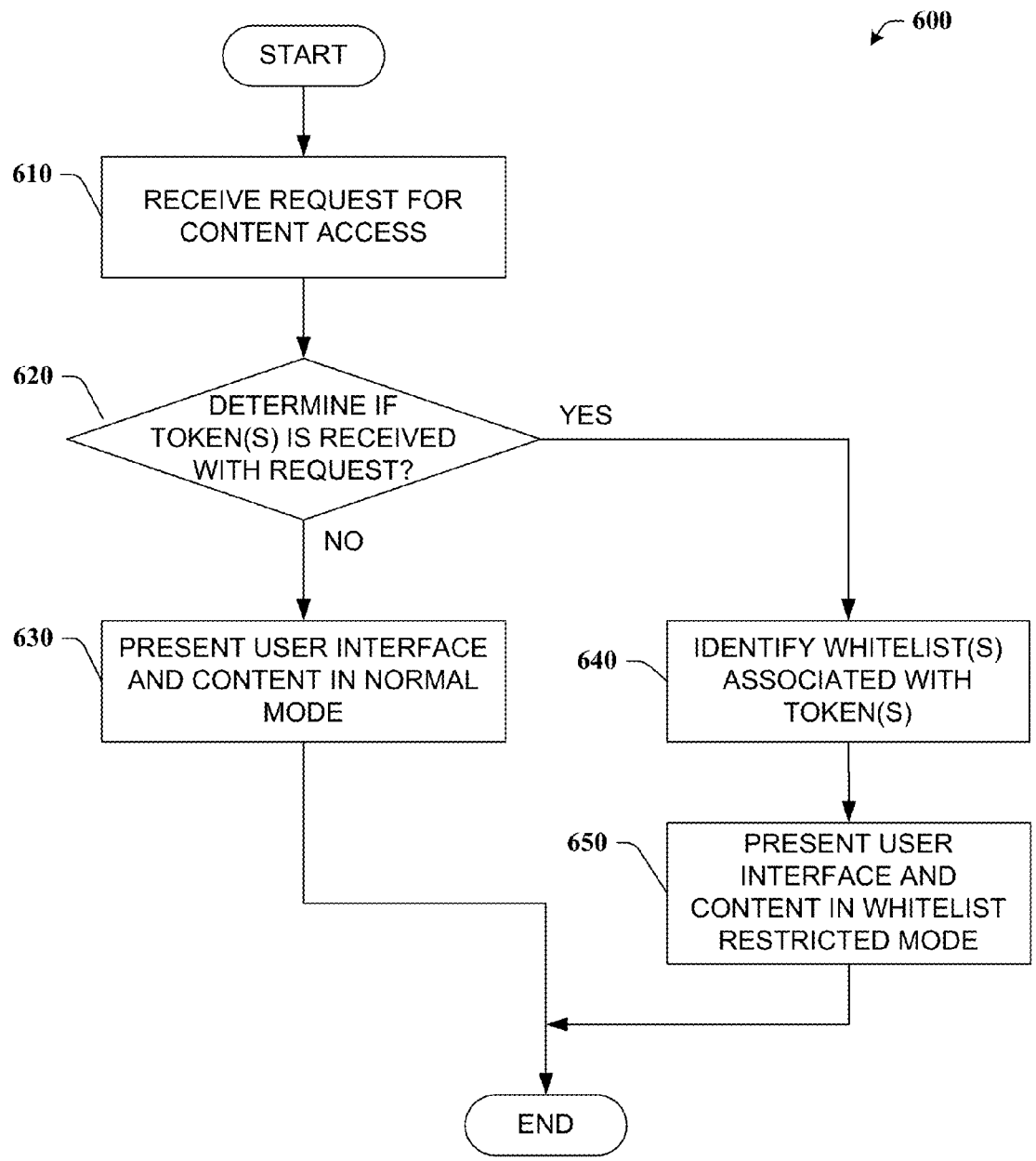
FIG. 6 illustrates an exemplary non-limiting flow diagram for presenting content in accordance with an implementation of this disclosure.

Referring to FIG. 6, an exemplary method 600 for presenting content is depicted. At reference numeral 610, a request for access to content is received from a client device 180 associated with an entity (e.g. by a content server 110 or a token receiving component 140). At reference numeral 620, a decision is made whether one or more tokens were associated or received with the request (e.g. by a content server 110 or a token receiving component 140). If the decision is "NO", meaning one or more tokens were not associated or received with the request, the method proceeds to reference numeral 630. If the decision is "YES", meaning one or more tokens were associated or received with the request, the method proceeds to reference numeral 640. At reference numeral 630, a user interface is presented in normal mode along with content (by a content presentation component 150, content user interface component 310, or a search component 320). At reference numeral 640, one or more whitelists associated with the one or more tokens are identified (by a token receiving component 140). At reference numeral 650, a user interface is presented in whitelist restricted mode along with content associated with the identified one or more whitelists (by a content presentation component 150, content user interface component 310, or a search component 320).

Figure 7:
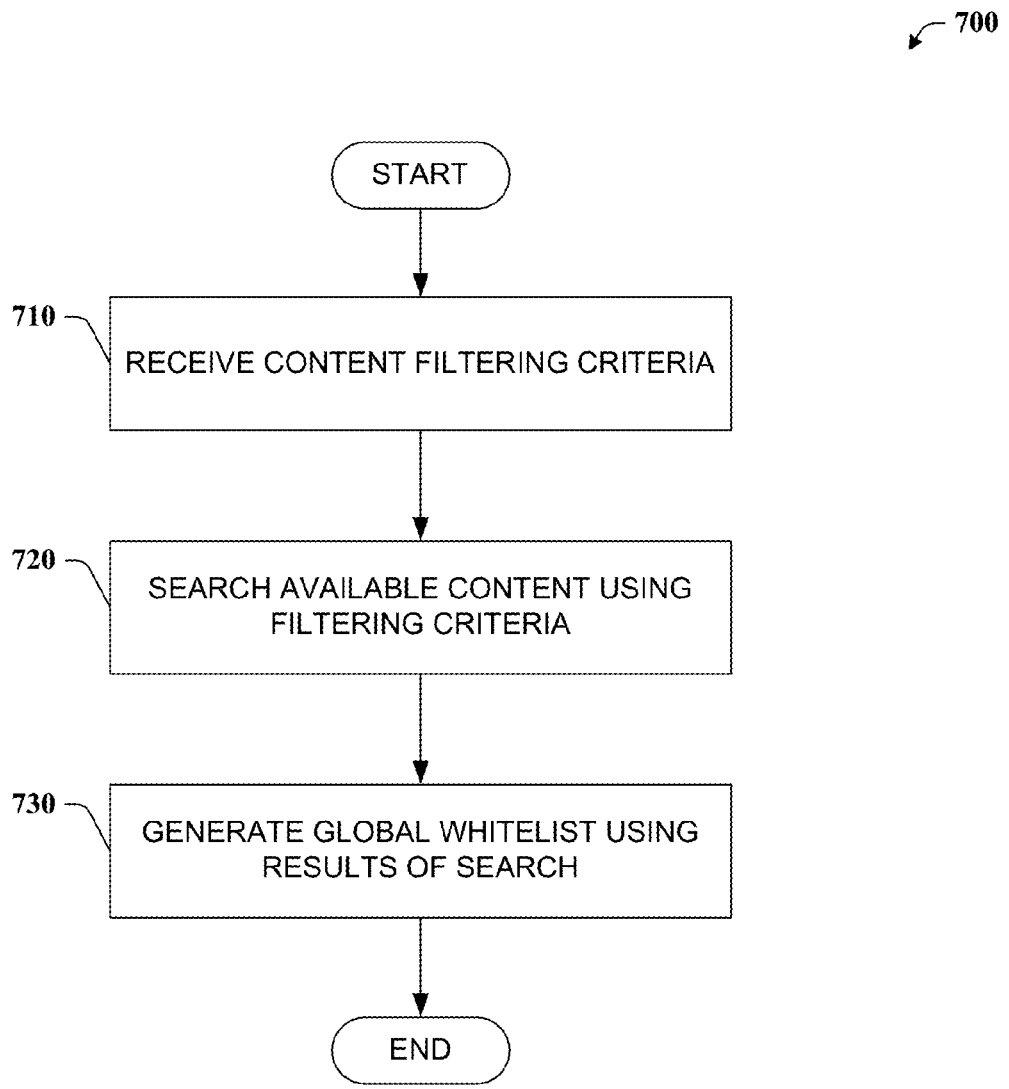
FIG. 7 illustrates an exemplary non-limiting flow diagram for generating a global whitelist in accordance with an implementation of this disclosure.

Referring to FIG. 7, an exemplary method 700 for generating a global whitelist is depicted. At reference numeral 710, content filtering criteria is received (e.g. by a whitelist component 130 or whitelist generation component 210). At reference numeral 720, a library of content is searched based upon the content filtering criteria (e.g. by a whitelist component 130 or whitelist generation component 210). At reference numeral 730, a global whitelist is generating based upon the results of the search at reference numeral 720 (e.g. by a whitelist component 130 or whitelist generation component 210). In a non-limiting example, all content identified in the search results can be excluded from the global whitelist. In another non-limiting example, all content identified in the search results can be included in the global whitelist.

Figure 8:
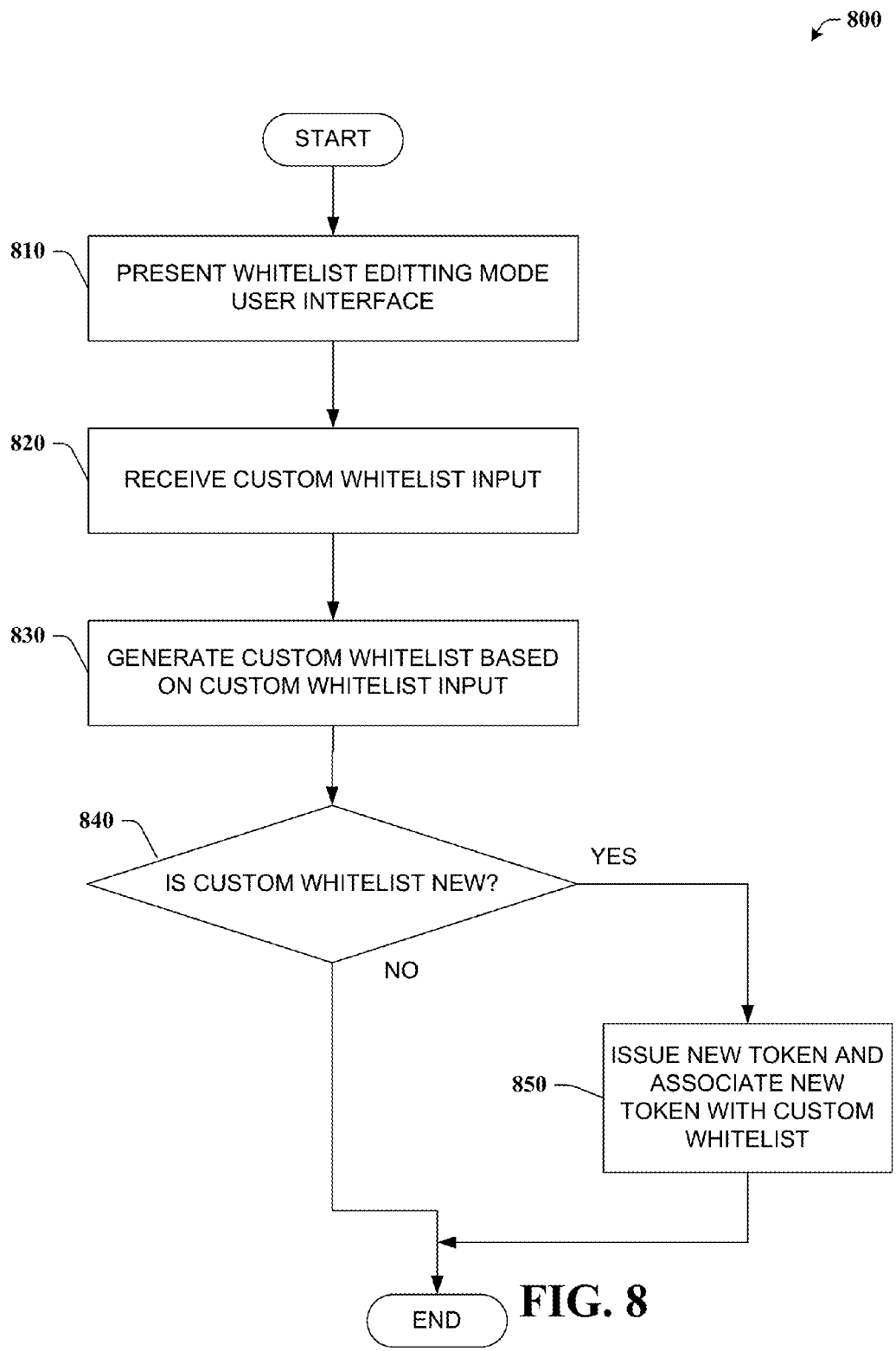
FIG. 8 illustrates an exemplary non-limiting flow diagram for generating a custom whitelist in accordance with an implementation of this disclosure.

Referring to FIG. 8, an exemplary method 800 for generating a custom whitelist is depicted. At reference numeral 810, a whitelist editing mode user interface is presented (e.g. by a whitelist component 130 or whitelist user interface component 220). At reference numeral 820, custom whitelist input is received specifying content to add to or exclude from a custom whitelist (e.g. by a whitelist component 130 or whitelist user interface component 220). At reference numeral 730, a custom whitelist is generating based upon custom whitelist input (e.g. by a whitelist component 130 or whitelist generation component 210). At reference numeral 840, a decision is made whether the generated custom whitelist is new (e.g. by a whitelist component 130 or whitelist generation component 210). If the decision is "YES", meaning the generated custom whitelist is new, the method proceeds to reference numeral 850. If the decision is "NO", meaning the generated custom whitelist is not new, the method ends. At reference numeral 850, a new token is issued and associated with the generated custom whitelist (e.g. by a token issuing component 120).

Exemplary Networked and Distributed Environments

One of ordinary skill in the art can appreciate that the various embodiments described herein can be implemented in connection with any computer or other client or server device, which can be deployed as part of a computer network or in a distributed computing environment, and can be connected to any kind of data store where media may be found. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services can also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the various embodiments of this disclosure.

Figure 9:
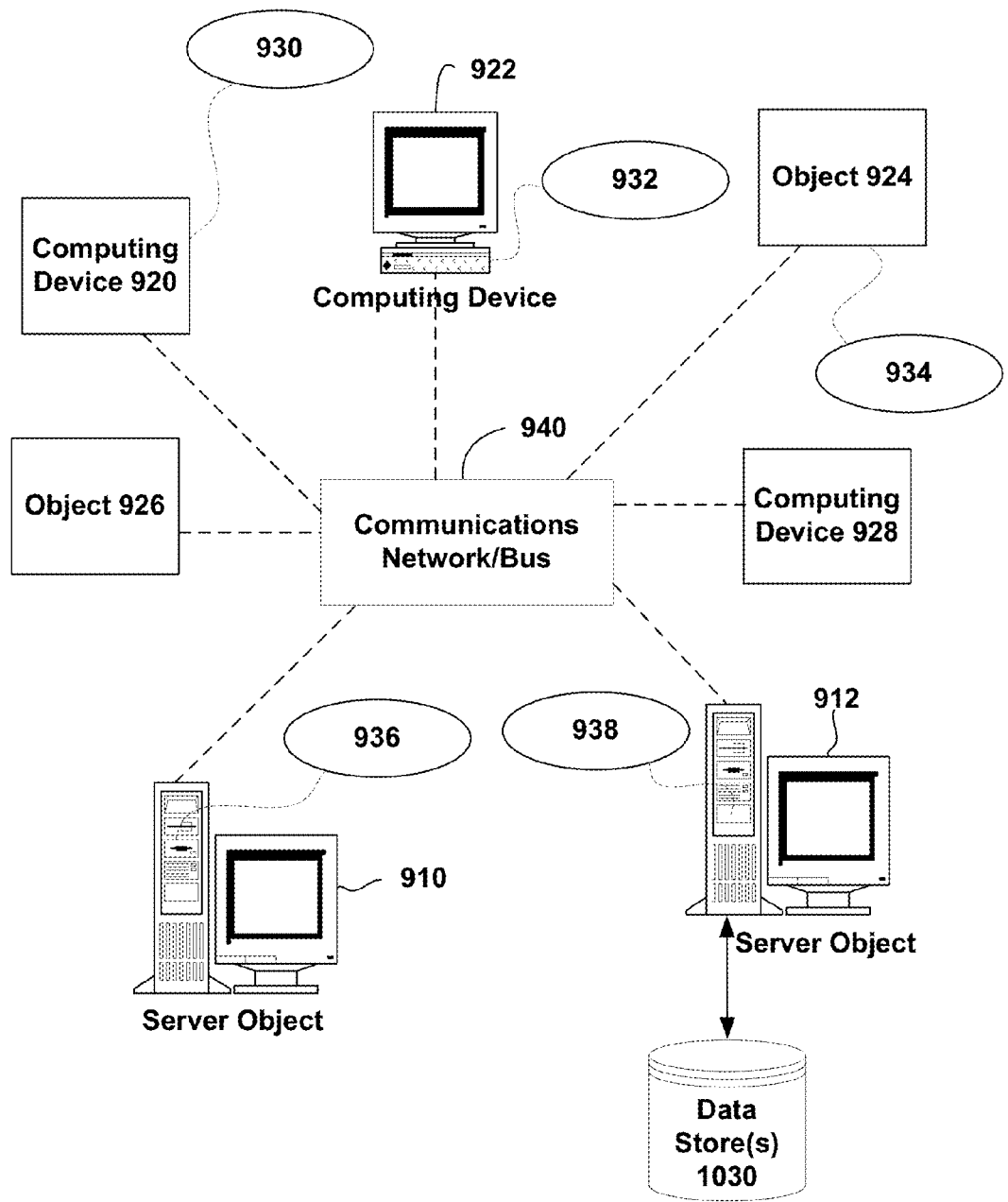
FIG. 9 is a block diagram representing an exemplary non-limiting networked environment in which the various embodiments can be implemented.

FIG. 9 provides a schematic diagram of an exemplary networked or distributed computing environment. The distributed computing environment comprises computing objects 910, 912, etc. and computing objects or devices 920, 922, 924, 926, 928, etc., which may include programs, methods, data stores, programmable logic, etc., as represented by applications 930, 932, 934, 936, 938. It can be appreciated that computing objects 910, 912, etc. and computing objects or devices 920, 922, 924, 926, 928, etc. may comprise different devices, such as personal digital assistants (PDAs), audio/video devices, mobile phones, MP3 players, personal computers, laptops, tablets, etc.

Each computing object 910, 912, etc. and computing objects or devices 920, 922, 924, 926, 928, etc. can communicate with one or more other computing objects 910, 912, etc. and computing objects or devices 920, 922, 924, 926, 928, etc. by way of the communications network 940, either directly or indirectly. Even though illustrated as a single element in FIG. 9, network 940 may comprise other computing objects and computing devices that provide services to the system of FIG. 9, and/or may represent multiple interconnected networks, which are not shown. Each computing object 910, 912, etc. or computing objects or devices 920, 922, 924, 926, 928, etc. can also contain an application, such as applications 930, 932, 934, 936, 938, that might make use of an API, or other object, software, firmware and/or hardware, suitable for communication with or implementation of various embodiments of this disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any suitable network infrastructure can be used for exemplary communications made incident to the systems as described in various embodiments herein.

Thus, a host of network topologies and network infrastructures, such as client/server, peer-to-peer, or hybrid architectures, can be utilized. The "client" is a member of a class or group that uses the services of another class or group. A client can be a computer process, e.g., roughly a set of instructions or tasks, that requests a service provided by another program or process. A client process may utilize the requested service without having to "know" all working details about the other program or the service itself.

In a client/server architecture, particularly a networked system, a client can be a computer that accesses shared network resources provided by another computer, e.g., a server. In the illustration of FIG. 9, as a non-limiting example, computing objects or devices 920, 922, 924, 926, 928, etc. can be thought of as clients and computing objects 910, 912, etc. can be thought of as servers where computing objects 910, 912, etc. provide data services, such as receiving data from client computing objects or devices 920, 922, 924, 926, 928, etc., storing of data, processing of data, transmitting data to client computing objects or devices 920, 922, 924, 926, 928, etc., although any computer can be considered a client, a server, or both, depending on the circumstances. Any of these computing devices may be processing data, or requesting transaction services or tasks that may implicate the techniques for systems as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network/bus 940 is the Internet, for example, the computing objects 910, 912, etc. can be Web servers, file servers, media servers, etc. with which the client computing objects or devices 920, 922, 924, 926, 928, etc. communicate via any of a number of known protocols, such as the hypertext transfer protocol (HTTP). Objects 910, 912, etc. may also serve as client computing objects or devices 920, 922, 924, 926, 928, etc., as may be characteristic of a distributed computing environment.

Exemplary Computing Device

As mentioned, advantageously, the techniques described herein can be applied to any suitable device. It is to be understood, therefore, that handheld, portable and other computing devices and computing objects of all kinds are contemplated for use in connection with the various embodiments. Accordingly, the computer described below in FIG. 10 is but one example of a computing device that can be employed with implementing one or more of the systems or methods shown and described in connection with FIGS. 1-8 Additionally, a suitable server can include one or more aspects of the below computer, such as a media server or other media management server components.

Although not required, embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

FIG. 10 thus illustrates an example of a suitable computing system environment 1000 in which one or aspects of the embodiments described herein can be implemented, although as made clear above, the computing system environment 1000 is only one example of a suitable computing environment and is not intended to suggest any limitation as to scope of use or functionality. Neither is the computing environment 1000 be interpreted as having any dependency or requirement relating to any one or combination of components illustrated in the exemplary operating environment 1000.

With reference to FIG. 10, an exemplary computing device for implementing one or more embodiments in the form of a computer 1010 is depicted. Components of computer 1010 may include, but are not limited to, a processing unit 1020, a system memory 1030, and a system bus 1022 that couples various system components including the system memory to the processing unit 1020.

Computer 1010 typically includes a variety of computer readable media and can be any available media that can be accessed by computer 1010. The system memory 1030 may include computer storage media in the form of volatile and/or nonvolatile memory such as read only memory (ROM) and/or random access memory (RAM). By way of example, and not limitation, system memory 1030 may also include an operating system, application programs, other program modules, and program data.

A user can enter commands and information into the computer 1010 through input devices 1040, non-limiting examples of which can include a keyboard, keypad, a pointing device, a mouse, stylus, touchpad, touchscreen, trackball, motion detector, camera, microphone, joystick, game pad, scanner, or any other device that allows the user to interact with computer 1010. A monitor or other type of display device is also connected to the system bus 1022 via an interface, such as output interface 1050. In addition to a monitor, computers can also include other peripheral output devices such as speakers and a printer, which may be connected through output interface 1050.

The computer 1010 may operate in a networked or distributed environment using logical connections to one or more other remote computers, such as remote computer 1070. The remote computer 1070 may be a personal computer, a server, a router, a network PC, a peer device or other common network node, or any other remote media consumption or transmission device, and may include any or all of the elements described above relative to the computer 1010. The logical connections depicted in FIG. 10 include a network 1072, such local area network (LAN) or a wide area network (WAN), but may also include other networks/buses e.g., cellular networks.

As mentioned above, while exemplary embodiments have been described in connection with various computing devices and network architectures, the underlying concepts may be applied to any network system and any computing device or system in which it is desirable to publish or consume media in a flexible way.

Also, there are multiple ways to implement the same or similar functionality, e.g., an appropriate API, tool kit, driver code, operating system, control, standalone or downloadable software object, etc. which enables applications and services to take advantage of the techniques described herein. Thus, embodiments herein are contemplated from the standpoint of an API (or other software object), as well as from a software or hardware object that implements one or more aspects described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the aspects disclosed herein are not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function (e.g., coding and/or decoding); software stored on a computer readable medium; or a combination thereof.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In order to provide for or aid in the numerous inferences described herein (e.g. inferring relationships between metadata or inferring topics of interest to users), components described herein can examine the entirety or a subset of the data to which it is granted access and can provide for reasoning about or infer states of the system, environment, etc. from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, $x=(x1, x2, x3, x4, xn)$, to a confidence that the input belongs to a class, as by $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

In view of the exemplary systems described above, methodologies that may be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention is not to be limited to any single embodiment, but rather can be construed in breadth, spirit and scope in accordance with the appended claims.

What is claimed is:

1. A system, comprising:
    a memory that has stored thereon computer executable components;
    a microprocessor that executes the following computer executable components stored in the memory:
        a whitelist component that maintains respective associations between tokens and whitelists, wherein a whitelist includes a subset of content items from a library of content items and a token indicates restriction of the library of content items to respective subsets of content items included in one or more whitelists associated with the token;
        a token receiving component that receives a request for access to the library of content items, wherein the request includes a plurality of tokens; and
        a content presentation component that, in response to receipt of the plurality of tokens, presents a user interface in whitelist restricted mode that restricts access to the library of content items to a union of the subsets of content items included in whitelists associated with the plurality of tokens.

2. The system of claim 1, the content presentation component further comprising a search component that:
    receives a search request from the user interface, wherein the search request includes the plurality of tokens; and
    in response to receipt of the plurality of tokens, restricts search results to the union of the subsets of content items included in whitelists associated with the plurality of tokens.

3. The system of claim 1, wherein the user interface displays an indication that the user interface is in whitelist restricted mode.

4. The system of claim 3, wherein the whitelist component further comprises a whitelist user interface that receives input indicating to enable or disable a custom whitelist, and the whitelist component, in response to the input indicating to enable the customer whitelist, enables the custom whitelist, and in response to the input indicating to disable the customer whitelist, disables the custom whitelist.

5. The system of claim 1, wherein the token is received via a Hypertext Transfer Protocol (HTTP) header.

6. The system of claim 1, wherein the token is received via a Uniform Resource Locator (URL) parameter.

7. The system of claim 1, wherein the token is received via a Hypertext Transfer Protocol (HTTP) cookie.

8. The system of claim 1, wherein the whitelist is a global whitelist.

9. The system of claim 1, wherein the whitelist component further comprises a whitelist user interface that receives input to create a custom whitelist, and in response to receiving the input, generates a request for issuance of a token to associate with the custom whitelist.

10. The system of claim 9, wherein the whitelist component further comprises a whitelist user interface that receives custom whitelist input identifying one or more content items to add to the custom whitelist.

11. The system of claim 9, wherein the whitelist generation component further comprises a whitelist application programming interface that receives a custom whitelist, and in response to receiving the custom whitelist, generates a request for issuance of a token to associate with the custom whitelist.

12. The system of claim 1, further comprising a token issuing component that issues a token in response to a request for token issuance.

13. A method, comprising:
    maintaining, by a system including a processor, respective associations between tokens and whitelists, wherein a whitelist includes a subset of content items from a library of content items and a token indicates restriction of the library of content items to respective subsets of content items included in one or more whitelists associated with the token;
    receiving, by the system, a request for access to the library of content items, wherein the request includes a plurality of tokens; and
    in response to receipt of the plurality of tokens, presenting, by the system, a user interface in whitelist restricted mode that restricts access to the library of content items to a union of the subsets of content items included in whitelists associated with the plurality of tokens.

14. The method of claim 13, further comprising:
    receiving, by the system, a search request from the user interface, wherein the search request includes the plurality of tokens; and
    in response to the receipt of the plurality of tokens, restricting, by the system, search results to the union of the subsets of content items included in whitelists associated with the plurality of tokens.

15. The method of claim 13, further comprising displaying, by the system, in the user interface an indication that the user interface is in whitelist restricted mode.

16. The method of claim 15, further comprising:
    receiving, by the system, input indicating to enable or disable a custom whitelist
    in response to the input indicating to enable the customer whitelist, enabling, by the system, the custom whitelist; and
    in response to the input indicating to disable the customer whitelist, disabling, by the system, the custom whitelist.

17. The method of claim 13, wherein the token is received via a Hypertext Transfer Protocol (HTTP) header.

18. The method of claim 13, wherein the token is received via a Uniform Resource Locator (URL) parameter.

19. The method of claim 13, wherein the token is received via a Hypertext Transfer Protocol (HTTP) cookie.

20. The method of claim 13, wherein the whitelist is a global whitelist.

21. The method of claim 13, further comprising:
    receiving, by the system, input to create a custom whitelist; and
    in response to receiving the input, generating, by the system, a request for issuance of a token to associate with the custom whitelist.

22. The method of claim 21, further comprising presenting a whitelist user interface that receives custom whitelist input identifying one or more content items to add to the custom whitelist.

23. The method of claim 21, further comprising:
    receiving, by the system via a whitelist application programming interface, the custom whitelist; and
    in response to receiving the custom whitelist, generating, by the system, a request for issuance of a token to associate with the custom whitelist.

24. The method of claim 13, further comprising issuing a token in response to a request for token issuance.

25. A non-transitory computer-readable storage medium having instructions stored thereon that, in response to execution, cause at least one device to perform operations comprising:
- maintaining respective associations between tokens and whitelists, wherein a whitelist includes a subset of content items from a library of content items and a token indicates restriction of the library of content items to respective subsets of content items included in one or more whitelists associated with the token;
- receiving a request for access to the library of content items, wherein the request includes a plurality of tokens; and
- in response to receipt of the plurality of tokens, presenting a user interface in whitelist restricted mode that restricts access to the library of content items to a union of the subsets of content items included in whitelists associated with the plurality of tokens.

26. The non-transitory computer-readable storage medium of claim 25, the operations further comprising:
- receiving a search request from the user interface, wherein the search request includes the plurality of tokens; and
- in response to the receipt of the plurality of tokens, restricting search results to the union of the subsets of content items included in whitelists associated with the plurality of tokens.

27. The non-transitory computer-readable storage medium of claim 25, the operations further comprising displaying in the user interface an indication that the user interface is in whitelist restricted mode.

28. The non-transitory computer-readable storage medium of claim 27, the operations further comprising:
- receiving input indicating to enable or disable a custom whitelist
- in response to the input indicating to enable the customer whitelist, enabling the custom whitelist; and
- in response to the input indicating to disable the customer whitelist, disabling the custom whitelist.

29. The non-transitory computer-readable storage medium of claim 25, wherein the token is received via a Hypertext Transfer Protocol (HTTP) header.

30. The non-transitory computer-readable storage medium of claim 25, wherein the token is received via a Uniform Resource Locator (URL) parameter.

31. The non-transitory computer-readable storage medium of claim 25, wherein the token is received via a Hypertext Transfer Protocol (HTTP) cookie.

32. The non-transitory computer-readable storage medium of claim 25, wherein the whitelist is a global whitelist.

33. The non-transitory computer-readable storage medium of claim 25, further comprising:
- receiving input to create a custom whitelist; and
- in response to receiving the input, generating a request for issuance of a token to associate with the custom whitelist.

34. The non-transitory computer-readable storage medium of claim 33, the operations further comprising presenting a whitelist user interface that receives custom whitelist input identifying one or more content items to add to the custom whitelist.

35. The non-transitory computer-readable storage medium of claim 33, the operations further comprising:
- receiving, via a whitelist application programming interface, the custom whitelist; and
- in response to receiving the custom whitelist, generating a request for issuance of a token to associate with the custom whitelist.

36. The non-transitory computer-readable storage medium of claim 25, the operations further comprising issuing a token in response to a request for token issuance.

* * * * *